United States Patent
Hiller

(10) Patent No.: US 12,157,371 B2
(45) Date of Patent: Dec. 3, 2024

(54) AERIAL DRONE HIGHWAY

(71) Applicant: The Boeing Company, Chicago, IL (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 64 days.

(21) Appl. No.: 18/064,589

(22) Filed: Dec. 12, 2022

(65) Prior Publication Data
US 2023/0123193 A1 Apr. 20, 2023

Related U.S. Application Data

(63) Continuation of application No. 15/930,668, filed on May 13, 2020, now Pat. No. 11,548,632.

(51) Int. Cl.
*B64C 9/02* (2006.01)
*B60L 53/18* (2019.01)
*B64U 50/34* (2023.01)
*G05D 1/00* (2006.01)

(52) U.S. Cl.
CPC .............. *B60L 53/18* (2019.02); *B64U 50/34* (2023.01); *G05D 1/0022* (2013.01); *B60L 2200/10* (2013.01)

(58) Field of Classification Search
None
See application file for complete search history.

(56) References Cited

U.S. PATENT DOCUMENTS

| | | |
|---|---|---|
| 11,040,773 B2 | 6/2021 | Furukawa et al. |
| 2014/0361750 A1 | 12/2014 | Lee et al. |
| 2016/0031564 A1 | 2/2016 | Yates |
| 2016/0318607 A1 | 11/2016 | Desai et al. |
| 2016/0357193 A1 * | 12/2016 | Bruemmer ............ G05D 1/106 |
| 2017/0015414 A1 | 1/2017 | Chan et al. |
| 2018/0095468 A1 * | 4/2018 | Yang ...................... B64D 27/24 |
| 2019/0217952 A1 | 7/2019 | Zawadzki et al. |
| 2019/0256207 A1 | 8/2019 | Nohmi et al. |
| 2019/0283871 A1 | 9/2019 | Wieczorek |
| 2019/0379226 A1 * | 12/2019 | Syracuse ................. B60L 53/38 |
| 2020/0106282 A1 | 4/2020 | Syracuse et al. |
| 2020/0369382 A1 | 11/2020 | Thrun et al. |

(Continued)

OTHER PUBLICATIONS

US Patent and Trademark Office; Office Action for U.S. Appl. No. 15/930,668 dated May 27, 2022.

(Continued)

*Primary Examiner* — Richard G Davis
(74) *Attorney, Agent, or Firm* — HANLEY, FLIGHT & ZIMMERMAN, LLC

(57) ABSTRACT

An in-flight aircraft tracking system may include a power transmission line suspended in the air and a radio frequency identification (RFID) reader configured to identify an aircraft in proximity to the power transmission line. A traffic control system may be configured to coordinate movement of multiple aircrafts in proximity to the power transmission line. An in-flight aircraft tracking method may include transmitting a reader signal from a RFID reader to an aircraft while the aircraft is in proximity to a power transmission line and receiving an identification signal in response to the reader signal from an RFID transmitter coupled to the aircraft.

20 Claims, 14 Drawing Sheets

(56) References Cited

U.S. PATENT DOCUMENTS

| | | |
|---|---|---|
| 2021/0013705 A1* | 1/2021 | Miron .................... B64C 39/024 |
| 2021/0066913 A1* | 3/2021 | Syracuse ................ G08G 5/003 |
| 2021/0276712 A1 | 9/2021 | Suzuki |
| 2021/0300557 A1 | 9/2021 | Oshima et al. |
| 2021/0316858 A1 | 10/2021 | Pargoe et al. |

OTHER PUBLICATIONS

US Patent and Trademark Office; Office Action for U.S. Appl. No. 15/930,600 dated Mar. 15, 2022.
US Patent and Trademark Office; Office Action for U.S. Appl. No. 15/930,600 dated Sep. 16, 2022.

* cited by examiner

AERIAL DRONE HIGHWAY

CROSS-REFERENCE TO RELATED APPLICATIONS

This application is a continuation of, and claims the benefit of, U.S. patent application Ser. No. 15/930,668, filed May 13, 2020, and entitled "Drone Data Sharing System," the contents of which are incorporated by reference herein in their entirety.

FIELD OF THE DISCLOSURE

This disclosure is generally related to the field of aircraft operations and, in particular, to systems and methods for in-flight power recharging, data sharing, and metering.

BACKGROUND

Drones may be safer and cheaper than traditional crewed aircraft and, in some cases, drones may have more capability. For this reason, drones are desirable in both military and commercial applications. One benefit of drones is that their size may be significantly smaller than crewed aircraft. However, as the size of drones are reduced, it may become challenging to maintain sufficient power for long flight times.

One solution is to provide landing stations at locations along a flightpath to enable the drone to land and recharge its power system. In some alternatives, a power storage device, e.g., battery or capacitor, may be swapped out for another. This may enable quickly providing drones with additional power for flight. However, in order to perform these charging operations, the drone typically lands on the landing station. By landing, time may be lost when the drone could be travelling or performing its desired function. Thus, typical methods for recharging drones may be inefficient. Another disadvantage of this approach is the high cost of building and maintaining power stations along the flight path. In addition, such landing pads can interfere with existing infrastructure or be aesthetically unappealing.

In some cases, drones may be equipped with looped magnetic field capture coils. These coils may be attached to a transformer of the drone at both ends of the coil. The coil may also have multiple loops in order to capture electrical energy from a magnetic field while the drone is near a magnetic field source. However, because these coils are looped and attached to the drone at both ends, it may be difficult to position the coils near the magnetic field source while the drone is in flight without risking an in-air collision due to gusts of wind for example. It may be particularly difficult to position a looped coil near a magnetic field source when the magnetic field source is a power transmission line. Another challenge associated with harvesting electrical power from a magnetic field source is positioning a coil relative to the magnetic field source (i.e., orienting the coil within the magnetic field) to optimize a level of generated power.

Flying drones near magnetic field sources, such as power transmission lines, may also be associated with various additional challenges. For example, if the drones want to communicate with each other at high data rates they may need to do this through airborne optical communication because radio frequency (RF) communication may be limited. Airborne optical communication may rely on lenses or reflective dishes that must be properly orientated to focus the light to provide enough gain to recover a signal. Lenses, dishes, and gimbals tend to bulky and heavy and therefore may not be suitable for small drones. Further, it may be difficult to send and receive airborne communications due to potential interference. Wind and weather patterns may increase the risk of collisions between drones, or the risk of contact between a drone and the power transmission line. Also, harvesting electrical power results in a cost to a utilities operator that operates the power grid associated with the power transmission lines. Typical power grids are not capable of identifying when electrical power is harvested from magnetic fields surrounding power transmission lines. Other disadvantages may exist

SUMMARY

Disclosed herein are systems and methods for overcoming at least some of the disadvantages of typical drone power recharging and power harvesting solutions. In an embodiment, an in-flight power recharging system includes an electrical conductor having a strand shape with a first end that is connected to an aircraft and a second end that is unconnected to the aircraft, where an alternating current (AC) signal is induced in the electrical conductor when the electrical conductor is in proximity to a changing magnetic field. The system further includes a rectifier circuit configured to convert the AC signal into a direct current (DC) signal and to provide the DC signal to an aircraft power system.

In some embodiments, the system includes a transformer configured to receive the AC signal from the electrical conductor, up-convert or down-convert the AC signal and to provide the AC signal to the rectifier circuit. In some embodiments, the rectifier circuit includes a diode bridge. In some embodiments, the aircraft and is a fixed wing drone, a single-rotor helicopter drone, or a multi-rotor helicopter drone. In some embodiments, the aircraft power system includes a battery or a capacitor and the DC signal is used to charge the battery or the capacitor. In some embodiments, the electrical conductor includes a wire or a foil. In some embodiments, the electrical conductor is configured to connect to a second aircraft at the second end while the first aircraft and the second aircraft are in flight. In some embodiments, the changing magnetic field is produced by a power transmission line suspended in the air. In some embodiments, a portion of the electrical conductor extends from the aircraft and is substantially without loops. In some embodiments, the system includes a reel configured to adjust a length of a portion of the electrical conductor that extends from the aircraft.

In an embodiment, an in-flight power recharging system includes an electrical conductor connected to a first aircraft at a first end of the electrical conductor, where the electrical conductor is configured to connect to a second aircraft at a second end of the electrical conductor while the first aircraft and the second aircraft are in flight, and where an AC signal is induced in the electrical conductor when the electrical conductor is in proximity to a changing magnetic field. The system further includes a first rectifier circuit at the first aircraft configured to convert the AC signal into a first DC signal and to provide the first DC signal to a first aircraft power system of the first aircraft. The system also includes a second rectifier circuit at the second aircraft configured to convert the AC signal into a second DC signal and to provide the second DC signal to a second aircraft power system of the second aircraft.

In some embodiments, the system includes a gripper ball attached at the second end of the electrical conductor and a reel at the first aircraft, where the first aircraft is configured to position itself directly over the second aircraft, and where the reel is configured to lower the electrical conductor from the first aircraft toward the second aircraft. In some embodiments, the system includes a clasp at the second aircraft, where the clasp is configured to actuate from an open state to a closed state to retain the gripper ball. In some embodiments, the gripper ball, the clasp, or both are conductive to enable an electrical connection between the first aircraft and the second aircraft. In some embodiments, the system includes a power transmission line suspended in the air, where the power transmission line produces the electromagnetic field, and where the first aircraft and the second aircraft are configured to orient the electrical conductor relative to the power transmission line based on a calculated level of power generation. In some embodiments, the system includes a first power transfer module at the first aircraft and a second power transfer module at the second aircraft, where the first power transfer module is configured to generate a power transfer signal and to transmit the power transfer signal the second power transfer module via the electrical conductor.

In an embodiment, an in-flight power recharging method includes extending an electrical conductor downward from a first aircraft while the first aircraft is in flight, where the electrical conductor has a strand shape with a first end that is connected to the first aircraft and a second end that is unconnected to the first aircraft, and where an AC signal is induced in the electrical conductor when the electrical conductor is in proximity to a changing magnetic field. The method further includes converting the AC signal into a DC signal at a rectifier circuit. The method also includes providing the DC signal to an aircraft power system.

In some embodiments, the method includes positioning the first aircraft above a second aircraft while the first aircraft and the second aircraft are in flight, unreeling the electrical conductor from the first aircraft to lower a gripper ball connected to the second end of the electrical conductor toward the second aircraft, actuating a clasp at the second aircraft from an open state to a closed state to retain the gripper ball, and repositioning the first aircraft, the second aircraft, or both, to orient the electrical conductor relative to the power transmission line based on a calculated level of power generation. In some embodiments, the method includes measuring a magnetic field at one or more positions proximate to a power transmission line and communicating data associated with the magnetic field to the second aircraft. In some embodiments, the method includes generating a power transfer signal at the first aircraft and providing the power transfer signal to the second aircraft via the electrical conductor.

In an embodiment, an in-flight data sharing system includes a communication line connected to a first aircraft at a first end of the communication line, where the communication line is configured to connect to a second aircraft at a second end of the communication line while the first aircraft and the second aircraft are in flight. The system further includes a first communication system at the first aircraft configured to send first data communications and receive second data communications via the communication line. The system also includes a second communication system at the second aircraft configured to send the second data communications and receive the first data communications via the communication line.

In some embodiments, the communication line includes an electrical conductor. In some embodiments, an AC signal is induced in the communication line when the communication line is in proximity to a changing magnetic field, and the system further includes a first rectifier circuit at the first aircraft configured to convert the AC signal into a first DC signal and to provide the first DC signal to a first aircraft power system of the first aircraft, and a second rectifier circuit at the second aircraft configured to convert the AC signal into a second DC signal and to provide the second DC signal to a second aircraft power system of the second aircraft. In some embodiments, the system includes a first transformer at the first aircraft configured to receive the AC signal from the electrical conductor, up-convert or down-convert the AC signal and to provide the AC signal to the first rectifier circuit, and a second transformer at the second aircraft configured to receive the AC signal from the electrical conductor, up-convert or down-convert the AC signal and to provide the AC signal to the second rectifier circuit.

In some embodiments, the system includes a first power transfer module at the first aircraft configured to generate a power transfer signal, and a second power transfer module at the second aircraft configured to receive the power transfer signal via the electrical conductor. In some embodiments, the first data communications and the second data communications include analog data signals, digital communication signals, or combinations thereof, and include incoherent modulation, coherent modulation, or combinations thereof. In some embodiments, the communication line includes a fiber optic cable, an electrical conductor, or both. In some embodiments, the first aircraft and the second aircraft are fixed wing drones, single-rotor helicopter drones, multi-rotor helicopter drones, cyclogyro, cyclocopter, or a combination thereof. In some embodiments, the system includes a gripper ball attached to an end of the communication line, and a reel at the first aircraft, wherein the first aircraft is configured to position itself directly over the second aircraft, and wherein the reel is configured to lower the communication line from the first aircraft toward the second aircraft. In some embodiments, the system includes a clasp at the second aircraft, where the clasp is configured to actuate from an open state to a closed state to retain the gripper ball.

In an embodiment, an in-flight data sharing system includes a communication line with a first end that is connected to an aircraft and a second end that is unconnected to the aircraft, where the communication line includes an electrical conductor, and where an AC signal is induced in the electrical conductor when the electrical conductor is in proximity to a changing magnetic field. The system further includes a communication system at the aircraft configured to send and receive data communications via the communication line while the aircraft is in flight. The system also includes a rectifier circuit configured to convert the AC signal into a DC signal and to provide the DC signal to an aircraft power system.

In some embodiments, the communication line includes a fiber optic cable. In some embodiments, the system includes a transformer configured to receive the AC signal from the electrical conductor, up-convert or down-convert the AC signal and to provide the AC signal to the rectifier circuit. In some embodiments, the aircraft power system includes a battery or a capacitor, and wherein the DC signal is used to charge the battery or capacitor. In some embodiments, the first data communications, the second data communications, or both include data associated with a magnetic field, aircraft position data, weather data, or a combination thereof.

In an embodiment, an in-flight data sharing method includes extending a communication line downward from a first aircraft while the first aircraft is in flight, where the communication line has a first end that is connected to the first aircraft and a second end that is unconnected to the first aircraft. The method further includes attaching the second end of the communication line to a second aircraft while the first aircraft and the second aircraft are in flight. The method includes sending first data communications and receiving second data communications via the communication line.

In some embodiments, the method includes positioning the first aircraft above a second aircraft while the first aircraft and the second aircraft are in flight, unreeling the electrical conductor from the first aircraft to lower a gripper ball connected to the second end of the communication line toward the second aircraft, and actuating a clasp at the second aircraft from an open state to a closed state to retain the gripper ball. In some embodiments, the method includes measuring a magnetic field at one or more positions proximate to a power transmission line, wherein the first data communications are associated with the magnetic field. In some embodiments, the communication line includes an electrical conductor, and an AC signal is induced in the electrical conductor when the electrical conductor is in proximity to a changing magnetic field, the method further including converting the AC signal into a DC signal at a rectifier circuit and providing the DC signal to an aircraft power system. In some embodiments, the method includes repositioning the first aircraft, the second aircraft, or both, to orient the electrical conductor relative to a power transmission line based on a calculated level of power generation.

Figure 1:
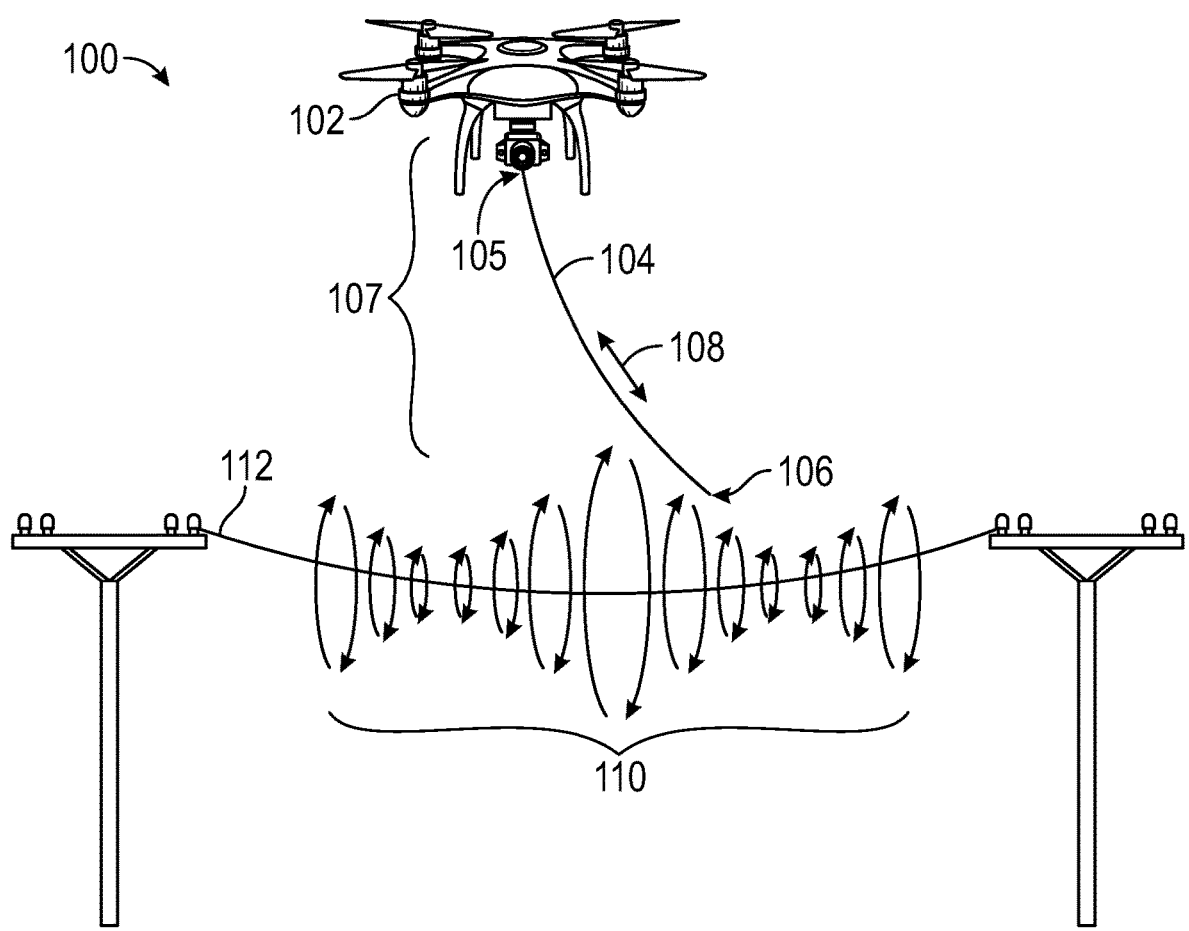
FIG. 1 is a diagram depicting an embodiment of an in-flight power recharging system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1 an embodiment of an in-flight power recharging system 100 is depicted. The system 100 may include an aircraft 102. The aircraft 102 may be a fixed wing drone, a single-rotor helicopter drone, a multi-rotor helicopter drone, cyclogyro or cyclocopter, another type of un-crewed aircraft, or combinations thereof.

The system 100 may include an electrical conductor 104 coupled to the aircraft 102. For example, the electrical conductor 104 may a strand shape with a first end 105 of the strand that is connected to the aircraft 102. The electrical conductor 104 may hang down from the aircraft 102 such that a second end 106 may be unconnected to the aircraft 102. As used herein, the term "strand shape" may denote any elongated string-like form. For example, the electrical conductor 104 may include a wire, which may be solid, twisted, braided, a foil, or some combination thereof. A portion 107 of the electrical conductor 104 may extend from the aircraft 102. The portion 107 may be substantially without loops. For example, the electrical conductor 104 may be connected to the aircraft 102 at only one end as opposed to looped antennas, which may be connected to a receiver at both ends. Further, looped antennas typically loop around and cross themselves at some point, whereas the electrical conductor 104 may not cross itself, at least along the portion 107 that extends from the aircraft 102.

The aircraft 102 may position itself so that the electrical conductor 104 is in proximity to a changing magnetic field 110 produced by the power transmission line 112. As used herein, being in proximity to the magnetic field 110 means that the electrical conductor 104 is close enough to the power transmission line 112 so that a non-negligible alternating current (AC) signal 108 may be induced in the electrical conductor 104. The AC signal 108 may be sufficiently strong to enable power harvesting via the electrical conductor 104.

Because the electrical conductor 104 hangs down from the aircraft 102, instead of looping back up to the aircraft 102, the electrical conductor 104 may be positioned closer to the power transmission line 112, where the magnetic field 110 may be stronger, than typical power harvesting aircraft that rely on looped antennas for power harvesting. Other benefits may exist.

Figure 2:
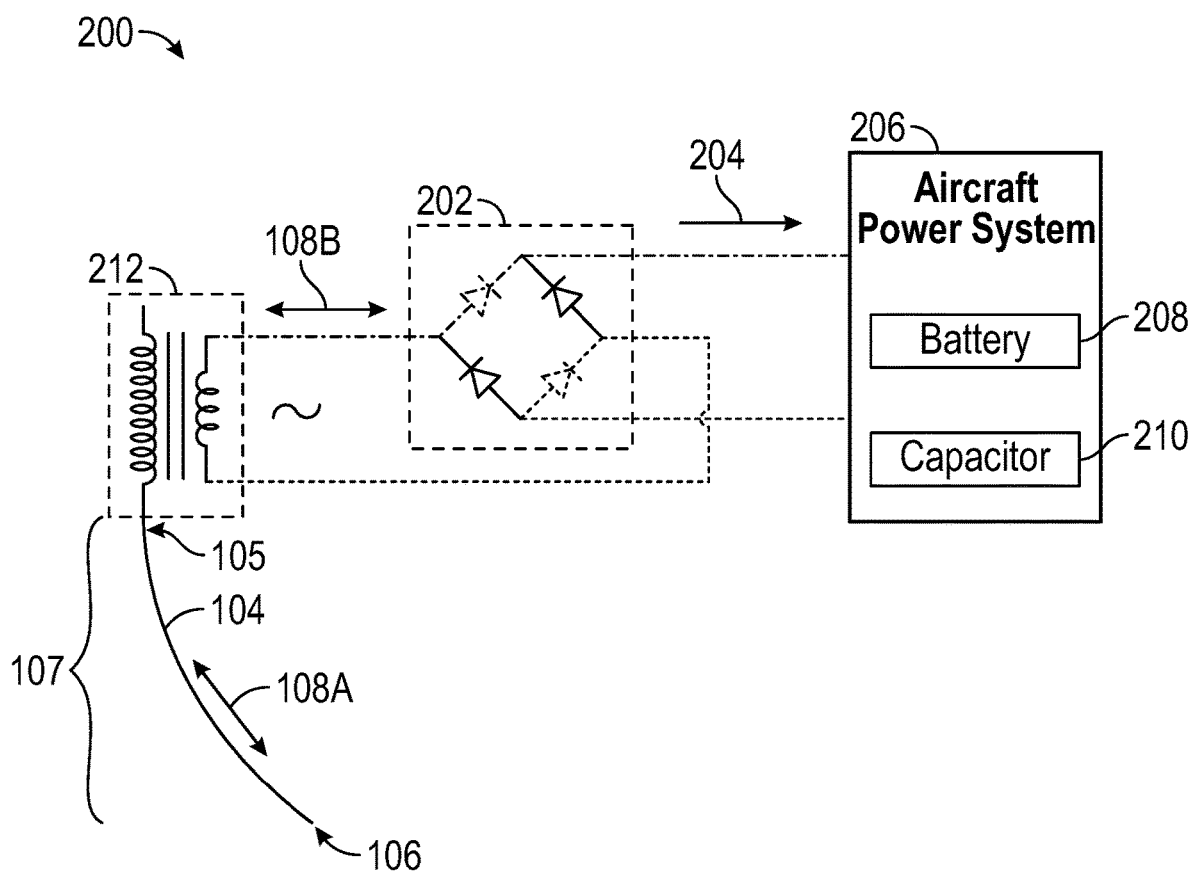
FIG. 2 is a schematic depicting an embodiment of an in-flight power recharging system.

Referring to FIG. 2 an embodiment of an in-flight power recharging system 200 is depicted. The system 200 may be included with, or otherwise connected to, the aircraft 102 of FIG. 1. As such, the system 200 may be used to enable the aircraft 102 of FIG. 1 to harvest electrical power from the power transmission line 112.

The system 200 may include a rectifier circuit 202, a transformer 212, and an aircraft power system 206. The electrical conductor 104 may be coupled to an input of the transformer 212 (e.g., to a set of transformer input coils). As shown, the first end 105 of the electrical conductor may be coupled to the transformer 212 while the second end 106 is not. Further, FIG. 2 depicts the portion 107 that extends outside of the aircraft 102 of FIG. 1 as coupled directly to the transformer 212. In practice, there may be intervening electrical circuitry between the portion 107 and the transformer 212. In particular, there may be a reel (described further herein) configured to increase or decrease a length of the portion 107 of the electrical conductor 104 that extends outside of the aircraft 102. The transformer may be in a down-convert or up-convert configuration, as determined by the power needs of the various components of the system 200. Multiple power harvesting configurations are possible.

An output of the transformer 212 (e.g., a set of transformer output coils) may be coupled to an input of the rectifier circuit 202. The rectifier circuit 202 may include a diode bridge as shown. Other types of rectifier circuits may also be used. An output of the rectifier circuit 202 may be coupled to an input of the aircraft power system 206. The aircraft power system 206 may include a battery 208, a capacitor 210, another type of energy storage device, or any combination thereof, which may be used to provide an aircraft (e.g., the aircraft 102 of FIG. 1) with electrical power. As used herein, the term "capacitor" also includes advanced capacitive elements, such as super capacitors.

During operation, an AC signal 108A may be generated at the electrical conductor 104 by the changing magnetic field 110 which may be produced by the power transmission line 112 of FIG. 1 suspended in the air. The numeral 108A may refer to the AC signal 108 of FIG. 1 while the AC signal 108 is at the electrical conductor 104. The numeral 108B may refer to the AC signal 108 while the AC signal 108 is between the transformer 212 and the rectifier circuit 202. The transformer 212 may receive the AC signal 108A from the electrical conductor 104 and up-convert or down-convert the AC signal 108A to generate the AC signal 108B (which is the same signal, only up-converted or down-converted). The transformer 212 may then provide the AC signal 108B to the rectifier circuit 202. The rectifier circuit 202 may convert the AC signal 108B into a direct current (DC) signal 204 and provide the DC signal 204 to the aircraft power system 206. The DC signal 204 may be used to charge the battery 208 or the capacitor 210.

Figure 3:
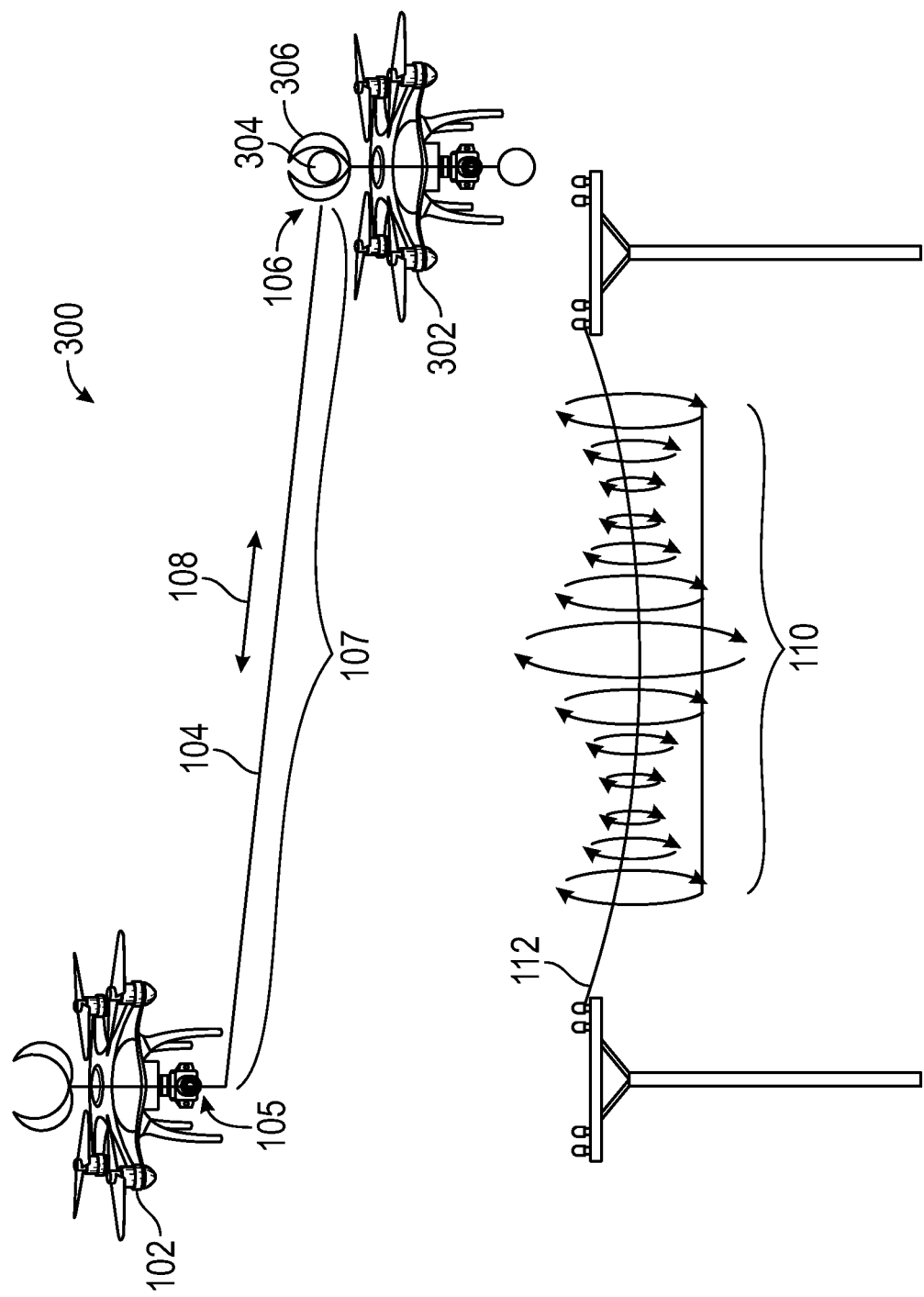
FIG. 3 is a diagram depicting an embodiment of an in-flight power recharging system.

Referring to FIG. 3, an embodiment of an in-flight power recharging system 300 is depicted. The system 300 may include an electrical conductor 104, as in the systems 100, 200, connected to a first aircraft 102 at a first end 105 of the electrical conductor 104. Further, the electrical conductor 104 may be configured to connect to a second aircraft 302 at a second end 106 of the electrical conductor 104 while the first aircraft 102 and the second aircraft 302 are in flight. In order to connect to the second aircraft 302, the electrical conductor 104 may include a gripper ball 304. The second aircraft 302 may include a clasp 306 having at least an open state and a closed state. For example, FIG. 3 depicts the clasp 306 in the closed state. The clasp 306 may retain the gripper ball 304 when in its closed state, thereby joining the first aircraft 102 and the second aircraft 302 in flight. Both the gripper ball 304 and the clasp 306 may include conductive material to enable electrical conductivity between the electrical conductor 104 and the aircraft 302.

During operation, a power transmission line 112 may, by carrying a power distribution signal, generate a changing magnetic field 110. An AC signal 108 may be induced in the electrical conductor 104 when the electrical conductor 104 is in proximity to the changing magnetic field 110. Both the first aircraft 102 and the second aircraft 302 may harvest electrical power from the AC signal 108 while connected. Additional operations that may be performed by the first aircraft 102 and the second aircraft 302 are further described herein.

The connection between the first aircraft 102 and the second aircraft 302 may enable the electrical conductor 104 to be positioned in any direction relative to the power transmission line 112 and the within the magnetic field 110. Thus, power harvesting operations using the electrical conductor 104 may be optimized. Other advantages may exist.

Figure 4:
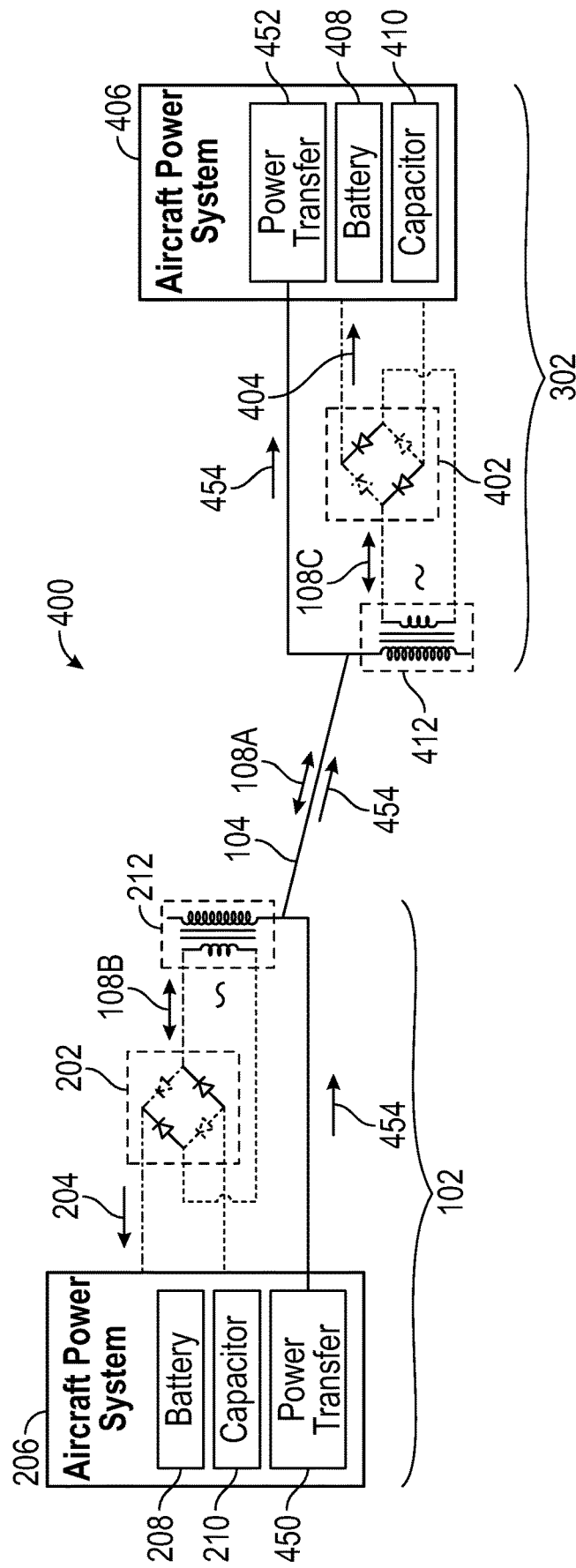
FIG. 4 is a schematic depicting an embodiment of an in-flight power recharging system.

Referring to FIG. 4, an embodiment of an in-flight power recharging system 400 is depicted. Portions of the system 400 may be included with, or otherwise connected to, the first aircraft 102 of FIG. 3 and the second aircraft 302 of FIG. 3. As such, the system 400 may be used to enable the first aircraft 102 and the second aircraft 302 to harvest electrical power from the power transmission line 112 of FIG. 3.

The system 400 may include a first transformer 212, a first rectifier circuit 202, a and a first aircraft power system 206 (at the first aircraft 102 of FIG. 3). The system 400 may also include a second transformer 412, a second rectifier circuit 402, and a second aircraft power system 406 (at the second aircraft 302 of FIG. 3).

In practice, there may be intervening electrical circuitry between the electrical conductor 104 and the first transformer 212 and the second transformer 412. For example, the gripper ball 304 and the clasp 306 of FIG. 3 may be positioned between the electrical conductor 104 and the second transformer 412. Because they are conductive, the first gripper ball 304 and the clasp 306 may not significantly affect the circuitry of FIG. 4, thus they have been omitted. The first transformer 212 and the second transformer 412 may be in a down-convert or up-convert configuration, as determined by the power needs of the various components of the system 400.

Some operations related to FIG. 4 may be similar to those described with reference to FIG. 2. An AC signal 108A may be generated at the electrical conductor 104. At the first aircraft 102, the first transformer 212 may receive the AC signal 108A from the electrical conductor 104 and up-convert or down-convert the AC signal 108A to generate the AC signal 108B (which is the same signal, only up-converted or down-converted). The first transformer 212 may then provide the AC signal 108B to the first rectifier circuit 202. The first rectifier circuit 202 may convert the AC signal 108B into a first direct current (DC) signal 204 and provide the first DC signal 204 to the first aircraft power system 206. The first DC signal 204 may be used to charge a first battery 208 or a first capacitor 210.

At the second aircraft 302, the second transformer 412 may receive the AC signal 108A from the electrical conductor 104 and up-convert or down-convert the AC signal 108A to generate the AC signal 108C (which is the same signal, only up-converted or down-converted). The second transformer 412 may then provide the AC signal 108C to the second rectifier circuit 402. The second rectifier circuit 402 may convert the AC signal 108C into a second DC signal 404 and provide the second DC signal 404 to the second aircraft power system 406. The second DC signal 404 may be used to charge a second battery 408 or a second capacitor 410.

The first aircraft 102 and the second aircraft 302 may also include a first power transfer module 450 and a second power transfer module 452, respectively. The first power transfer module 450 and the second power transfer module 452 may be used to conduct power transfers between the first aircraft power system 206 and the second aircraft power system 406. For example, the first power transfer module 450 may be configured to generate a power transfer signal 454 and transmit the power transfer signal 454 to the second power transfer module 452 via the electrical conductor 104. This may enable an aircraft with a charged battery to provide power for another aircraft that may have a low battery. In some cases, the first aircraft 102 may be a "refueling" aircraft and the first battery 208 may have sufficient charge to provide power to multiple aircraft. In FIG. 4, the power transfer signal 454 is depicted as a DC signal. However, the power transfer signal 454 may be an AC signal or a DC signal. Further, the system 400 may include additional circuitry, such as an inverter (not shown), which may be used to create the power transfer signal 454.

A benefit of the system 400 is that the AC signal 108A may be shared between both the first aircraft power system 206 and the second aircraft power system 406 to share power harvesting resources. Another benefit is that power may be transmitted between the first aircraft 102 and the second aircraft 302. Other benefits may exist.

Figure 5C:
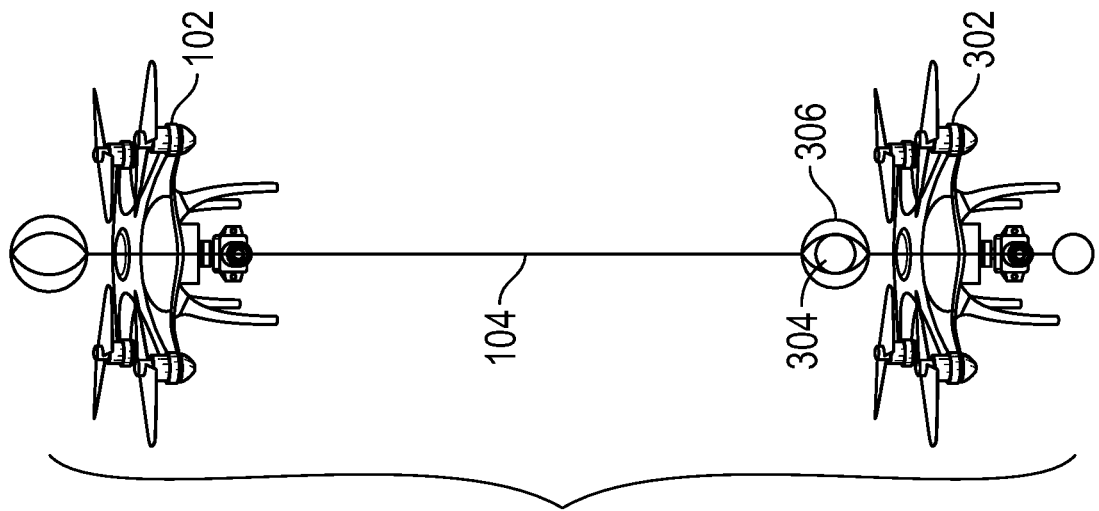
FIG. 5C is a diagram depicting an embodiment of third configuration of aircrafts for an in-flight power recharging method.
Figure 5B:
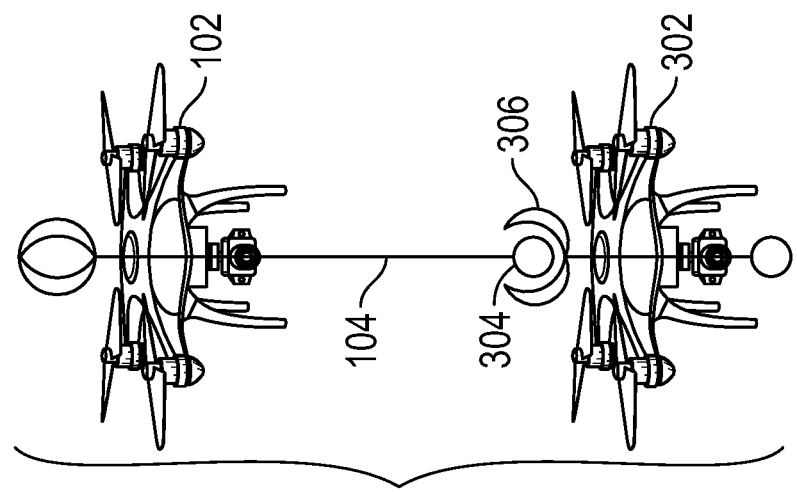
FIG. 5B is a diagram depicting an embodiment of second configuration of aircrafts for an in-flight power recharging method.

Referring to FIGS. 5A-5D, the first aircraft 102 and the second aircraft 302 are depicted in configurations associated with a process for multiple aircraft power recharging. In FIG. 5E, the first aircraft 102 is depicted in a configuration for single aircraft power recharging.

Figure 5A:
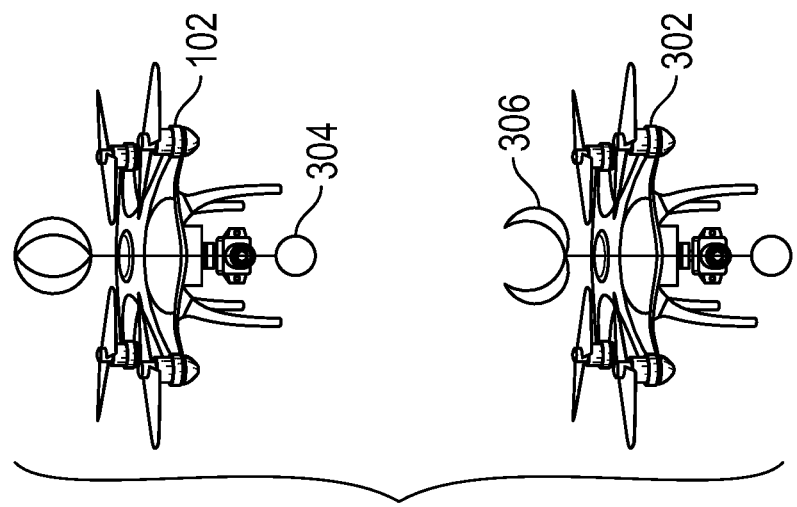
FIG. 5A is a diagram depicting an embodiment of a first configuration of aircrafts for an in-flight power recharging method.

As shown in FIG. 5A, the first aircraft 102 may be positioned above the second aircraft 302 while the first aircraft 102 and the second aircraft 302 are in flight. The gripper ball 304 may be in a retracted state and the clasp 306 may be in an open state.

Referring to FIG. 5B, the electrical conductor 104 from the first aircraft 102 may be unreeled in order to lower the gripper ball 304 toward the second aircraft 302. The clasp 306 may be actuated from the open state to a closed state in order to retain the gripper ball 304, thereby connecting the first aircraft 102 and the second aircraft 302.

Figure 5D:
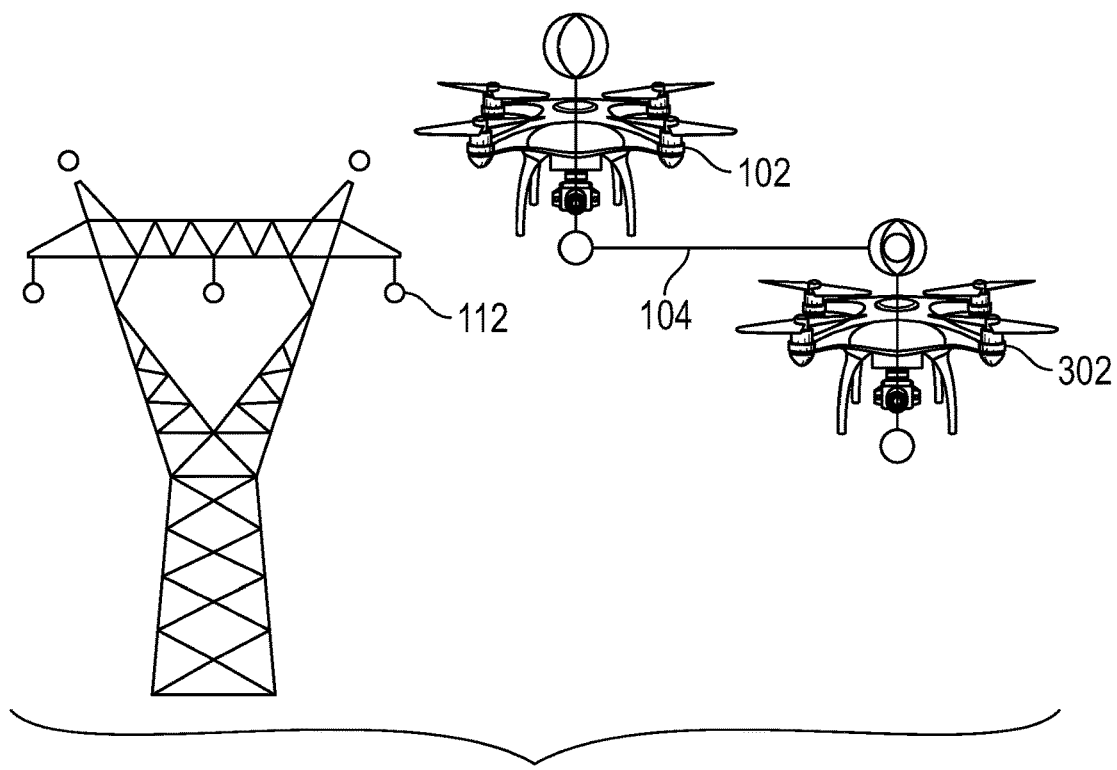
FIG. 5D is a diagram depicting an embodiment of fourth configuration of aircrafts for an in-flight power recharging method.
Figure 5E:
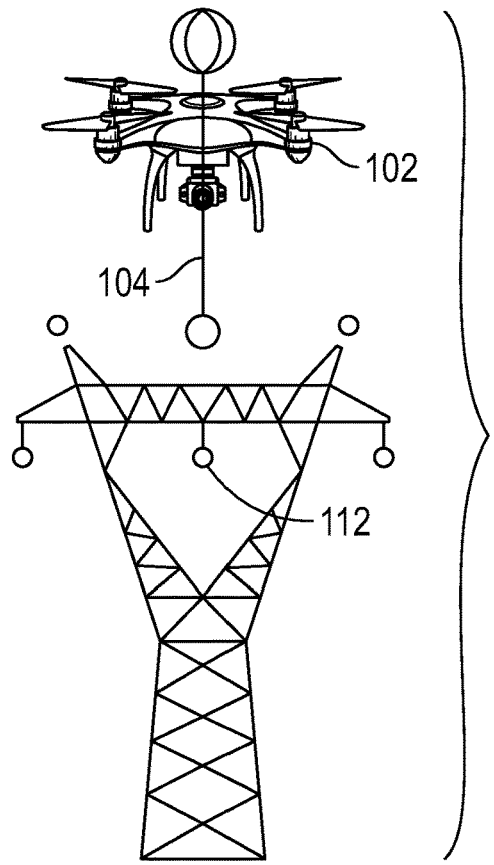
FIG. 5E is a diagram depicting an embodiment of a configuration of an aircraft for an in-flight power recharging method.

In FIG. 5C, after the first aircraft 102 and the second aircraft 302 are connected, the electrical conductor 104 may be further unreeled to a predetermined, or otherwise calculated length based on measured field data. As shown in FIG. 5D, the electrical conductor 104 may be oriented relative to a power transmission line 112 suspended in the air. For example, the first aircraft 102, the second aircraft 302, or both, may be repositioned to orient the electrical conductor 104 relative to the power transmission line 112. The orientation of the electrical conductor 104 may be based on a calculated level of power generation. In practice the orientation may be tuned and updated based on real-time measurements of a magnetic field associated with the power transmission line 112 and/or based on real-time measurements of a current within the electrical conductor 104. In order to maintain the updated orientations, the magnetic field may be measured (for example, by the first aircraft 102) at one or more positions proximate to the power transmission line 112 and may be communicated to the other aircraft (e.g., the second aircraft 302).

The first aircraft 102 and the second aircraft 302 may then convert an AC signal within the electrical conductor 104 into a DC signal 204 and provide the DC signal 204 to their respective aircraft power system.

Referring to FIG. 5E an embodiment of a configuration of a single aircraft 102 for in-flight power recharging is depicted. In general, power harvesting may be more effective when the electrical conductor 104 is perpendicular, or otherwise transverse, to the power transmission line 112. Thus, the aircraft 102 may fly substantially over the power transmission line 112 as shown. The gripper ball 304 may provide weight to maintain the electrical conductor 104 in a vertical position.

Figure 6:
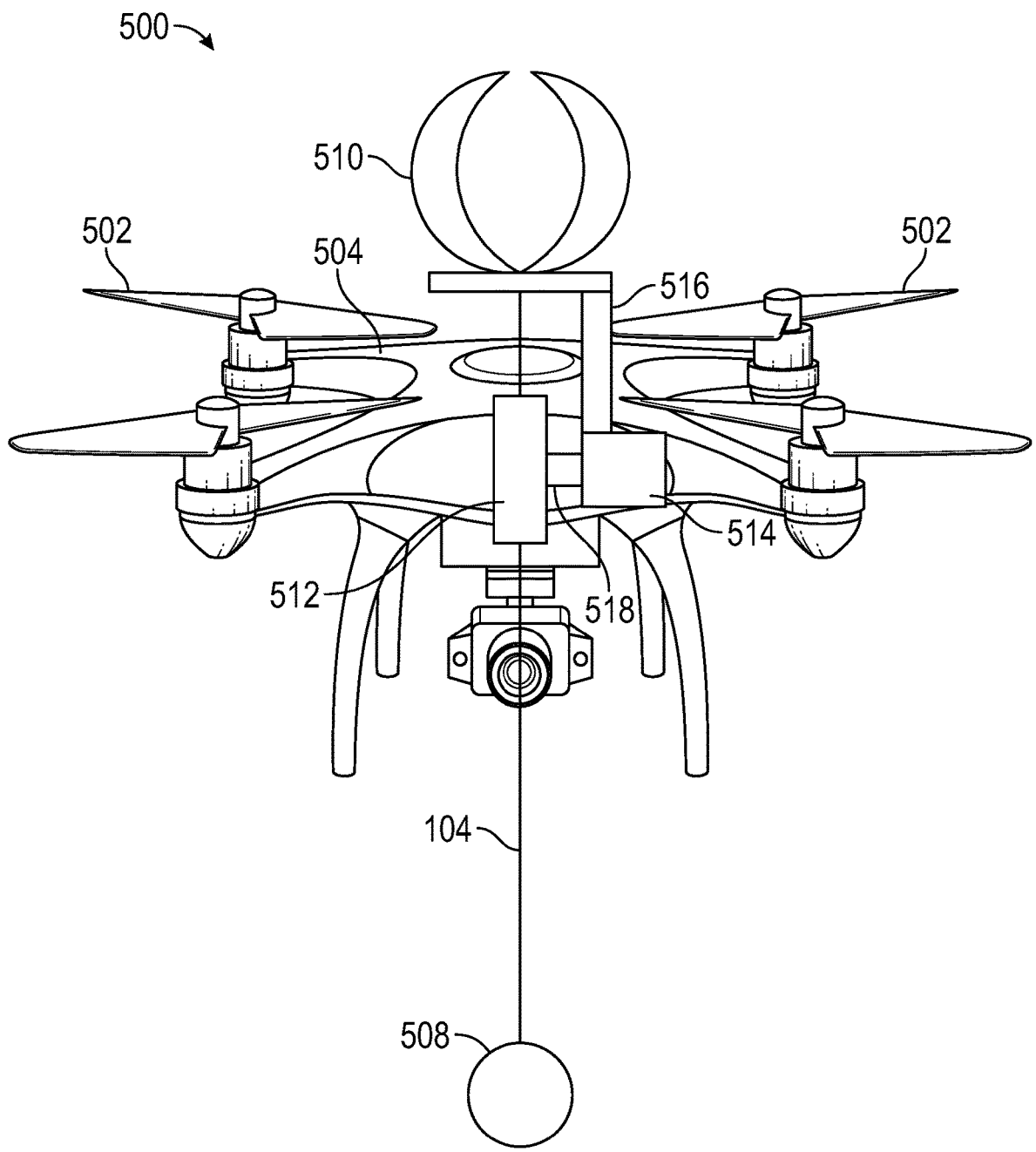
FIG. 6 is a diagram depicting an embodiment of an aircraft for use with an in-flight power recharging system.

Referring to FIG. 6, an embodiment of an aircraft 500 for use with an in-flight power recharging system is depicted. The aircraft 500 may correspond to any of the aircrafts described herein, such as the first aircraft 102 and/or the second aircraft 302. The aircraft 500 may include multiple rotors 502 and may be a multi-rotor helicopter drone. However, the disclosure is not limited only to multi-rotor helicopter drones and may be equally applied to fixed-wing aircrafts and single-rotor helicopter drones as well and cyclogyro, or cyclocopters. The aircraft 500 may further include a body 504 and an electric motor 514 housed within the body.

An electrical conductor 104 may be attached to the aircraft 500 and a reel 512 may enable the electrical conductor 104 to be extended and retracted. In some embodiments, the electrical conductor 104 includes a 13 gauge, or 1.83 mm, copper wire. Other conductive wires or foils are possible. A gripper ball 508 may be attached to the electrical conductor 104 to provide weight and/or stability to the electrical conductor 104 while it is extended. The aircraft 500 may further include a clasp 510. In multiple aircraft systems, the clasp 510 may be used to retain the gripper ball 508 of another aircraft. In order to facilitate electrical power harvesting and transfer, as described herein, both the gripper ball 508 and the clasp 510 may be formed from conductive material. In other embodiments, the gripper ball 508 and the clasp 510 may be plastic (for light weight applications). For example, the gripper ball 508 may be formed from hollow plastic 400 micrometers thick. Additional conductors (not shown) may be applied to the gripper ball to maintain conductivity. The clasp 510 may be three-dimensional (3D) printed honeycomb plastic. The electric motor 514 may provide mechanical power to the reel 512 and the clasp 510 via shafts 516, 518. Although not shown, the aircraft 500 may include a controller configured to perform any of operations described herein.

Figure 7:
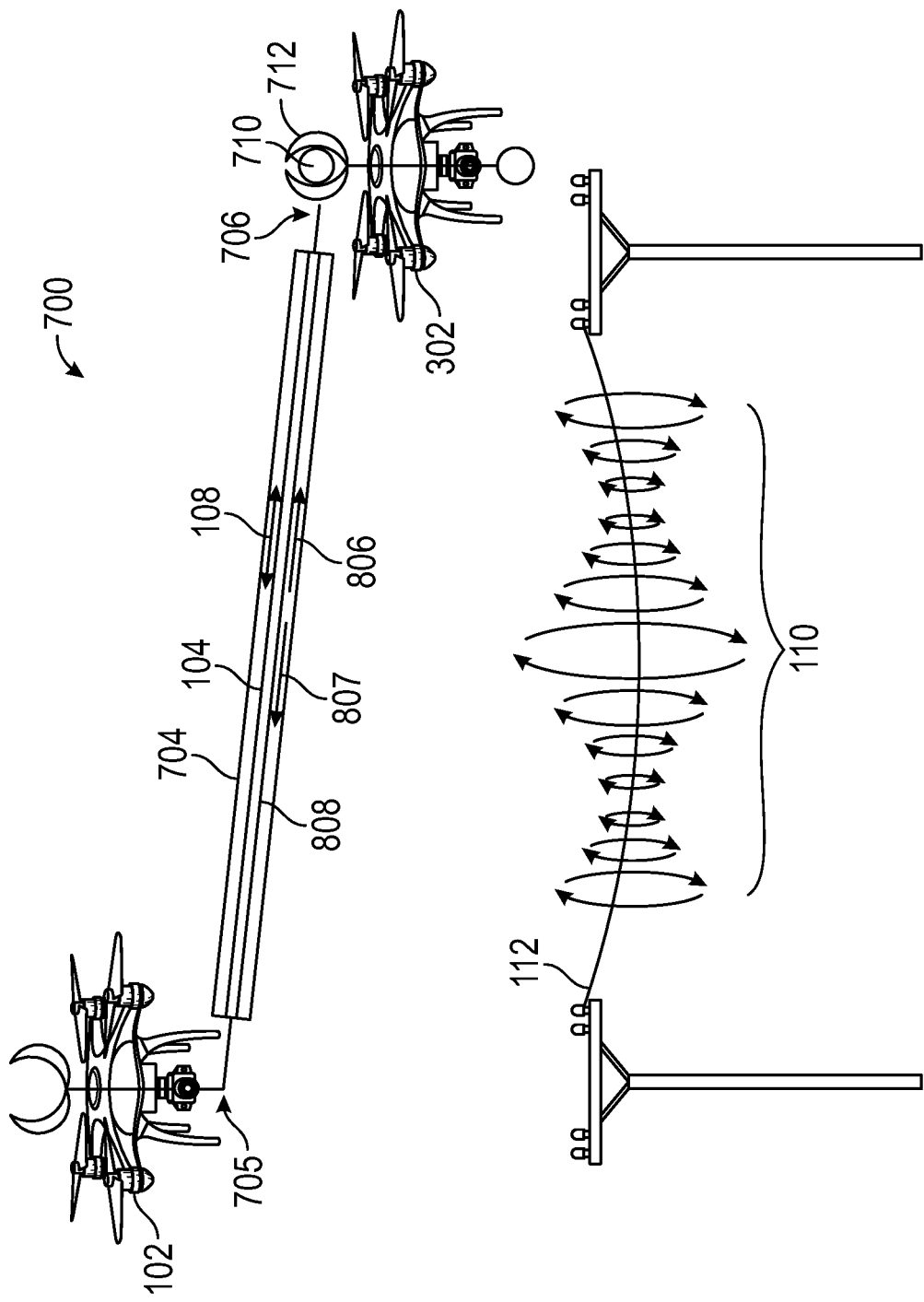
FIG. 7 is a diagram depicting an embodiment of an in-flight data sharing system.

Referring to FIG. 7, an embodiment of an in-flight data sharing system 700 is depicted. The system 700 may include a communication line 704 connected to a first aircraft 102 at a first end 705 of the communication line 704. The communication line 704 may be configured to connect to a second aircraft 302 at a second end 706 of the communication line 704 while the first aircraft 102 and the second aircraft 302 are in flight. The communication line 704 may include an electrical conductor 104 and an optical cable 808. In some cases, the optical cable 808 and the electrical conductor 104 may be braided together, or otherwise connected, into a single strand. Although not shown in FIG. 7, additional circuitry may be used to interface both the optical cable 808 and the conductor 104 to the aircraft 102 and the aircraft 302. For example, the gripper ball 710, the clasp 712, or both may include an optical reader configured to convert first data communication 806 and second data communications 807 between electrical and optical signals. The first aircraft 102 and the second aircraft 302 may be fixed wing drones, single-rotor helicopter drones, multi-rotor helicopter drones, another type of aircraft, cyclogyro, or cyclocopter, or a combination thereof (meaning one of the aircrafts may be one type while the other aircraft is another type).

In order to connect to the second aircraft 302, the communication line 704 may include a gripper ball 710. The second aircraft 302 may include a clasp 712 having at least an open state and a closed state. For example, FIG. 7 depicts the clasp 712 in the closed state. The clasp 712 may retain the gripper ball 710 when in its closed states, thereby joining the first aircraft 102 and the second aircraft 302 in flight. In cases where the communication line 704 relies on conductivity, both the gripper ball 710 and the clasp 712 may include conductive material to enable electrical conductivity between the communication line 704 and the aircraft 302. In cases where the communication line 704 may rely on fiber optic communications, the gripper ball 710 and the clasp 712 may include an optical interface to enable communications.

During operation, the first aircraft 102 may be configured to position itself directly over the second aircraft 302. A reel may be used to lower the communication line 704 from the first aircraft 102 toward the second aircraft 302. The clasp 712 may then actuate from an open state to a closed state to retain the gripper ball 710. After a connection is made, the first aircraft 102 may send first data communications 806 to the second aircraft 302 via the communication line 704 and may receive second data communications 807 from the second aircraft 302. This may enable the first aircraft 102 and the second aircraft 302 to communicate securely. Also, the communications 806 and 807 may be substantially free of interference that may occur with wireless communications in the presences of a power transmission line 112.

The communication line 704 may also enable the first aircraft 102 and the second aircraft 302 to perform power harvesting from a power transmission line 112 generating a changing magnetic field 110 as described herein. For example, an AC signal 108 may be induced in the communication line 704 when the communication line 704 is in proximity to the changing magnetic field 110. Both the first aircraft 102 and the second aircraft 302 may harvest electrical power from the AC signal 108.

Figure 8:
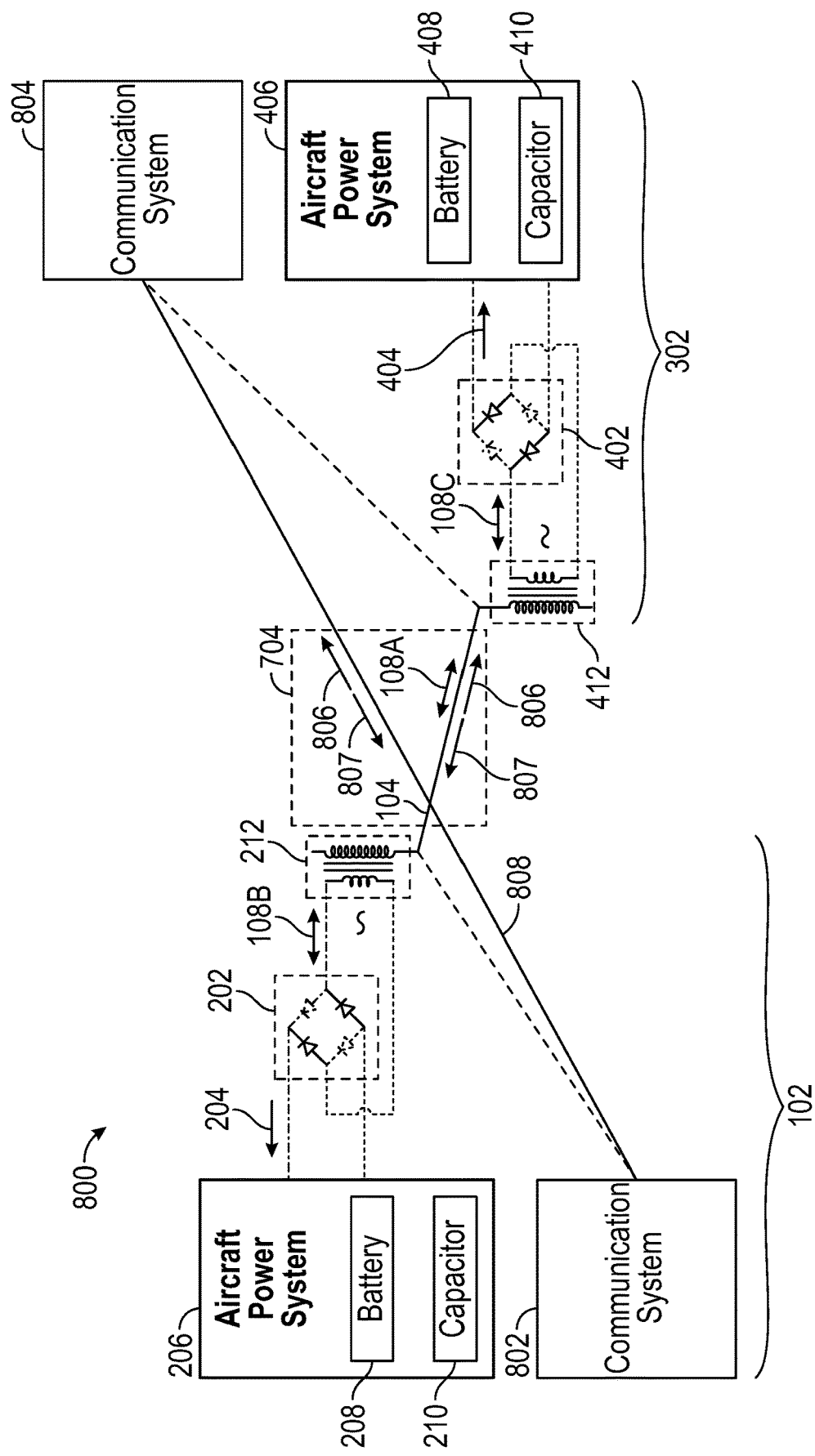
FIG. 8 is a schematic depicting an embodiment of an in-flight data sharing system

Referring to FIG. 8 an embodiment of an in-flight data sharing system 800 is depicted. Portions of the system 800 may be included with, or otherwise connected to, the first aircraft 102 of FIG. 7 and the second aircraft 302 of FIG. 7. As such, the system 800 may be used to enable the first aircraft 102 and the second aircraft 302 to communicate with each other and to harvest electrical power from the power transmission line 112 of FIG. 7.

The system 800 may include a first transformer 212, a first rectifier circuit 202, a and a first aircraft power system 206 (at the first aircraft 102 of FIG. 7). The system 800 may also include a second transformer 412, a second rectifier circuit 402, and a second aircraft power system 406 (at the second aircraft 302 of FIG. 7).

In practice, there may be intervening electrical circuitry between the electrical conductor 104 and the first transformer 212 and the second transformer 412. For example, the gripper ball 710 and the clasp 712 of FIG. 7 may be positioned between the electrical conductor 104 and the second transformer 412. Because the gripper ball 710 and the clasp 712 may be configured to enable communication and/or may be electrically conductive, they may not significantly affect the circuitry of FIG. 8, thus they have been omitted.

The system 800 may also include a first communication system 802 at the first aircraft 102 and a second communication system 804 at the second aircraft 302. A communication line 704 may connect the first communication system 802 and the second communication system 804 while the first aircraft 102 and the second aircraft 302 are in flight. Although the communication line 704 is illustrated as multiple lines, in practice the communication line 704 could be braided together, or otherwise connected, into a single strand. The communication line 704 may include an electrical conductor 104 and a fiber optic cable 808. As used herein, the term "fiber optic cable" is understood to mean at least one optical fiber and may, but does not necessarily, include additional materials generally associated with optical communication including cladding, shielding, relays, etc. The fiber optic cable 808 may be used to transmit first data communications 806 from the first communication system 802 to the second communication system 804 and to transmit second data communications 807 from the second communication system 804 to the first communication system 802.

In some embodiments, the fiber optic cable 808 may be omitted and communication may be performed via the electrical conductor 104 as denoted by the dashed lines between the communication systems 802, 804 and the electrical conductor 104. When transmitted through the electrical conductor 104, the first data communications 806 and the second data communications 807 may include analog data signals, digital communication signals, or combinations thereof, and may include incoherent modulation, coherent modulation, or combinations thereof.

Some operations related to FIG. 8 may be similar to those described with reference to FIG. 4. For example, an AC signal 108A may be induced in the communication line 704 (e.g., within the electrical conductor 104) when the communication line 704 is in proximity to a changing magnetic field such as the magnetic field 110 depicted in FIG. 7. The first transformer 212 at the first aircraft 102 may up-convert or down-convert the AC signal 108A into the AC signal 108B and the rectifier circuit 202 may convert the AC signal 108B into a first DC signal 204 and provide the first DC signal 204 to a first aircraft power system 206. Likewise, the second transformer 412 at the second aircraft 302 may up-convert or down-convert the AC signal 108A into the AC signal 108C and the second rectifier circuit 402 may convert the AC signal 108C into a second DC signal 404 and provide the second DC signal 404 to a second aircraft power system 406. The first DC signal 204 and the second DC signal 404 may be used to charge a first battery 208 or a first capacitor 210 and a second battery 408 or a second capacitor 410.

Although not shown in FIG. 8, the system 800 may further include the power transfer modules as described with reference to FIG. 4. For example, a first power transfer module at the first aircraft 102 may be configured to generate a power transfer signal and a second power transfer module at the second aircraft 302 may be configured to receive the power transfer signal via the electrical conductor 104.

Figure 9:
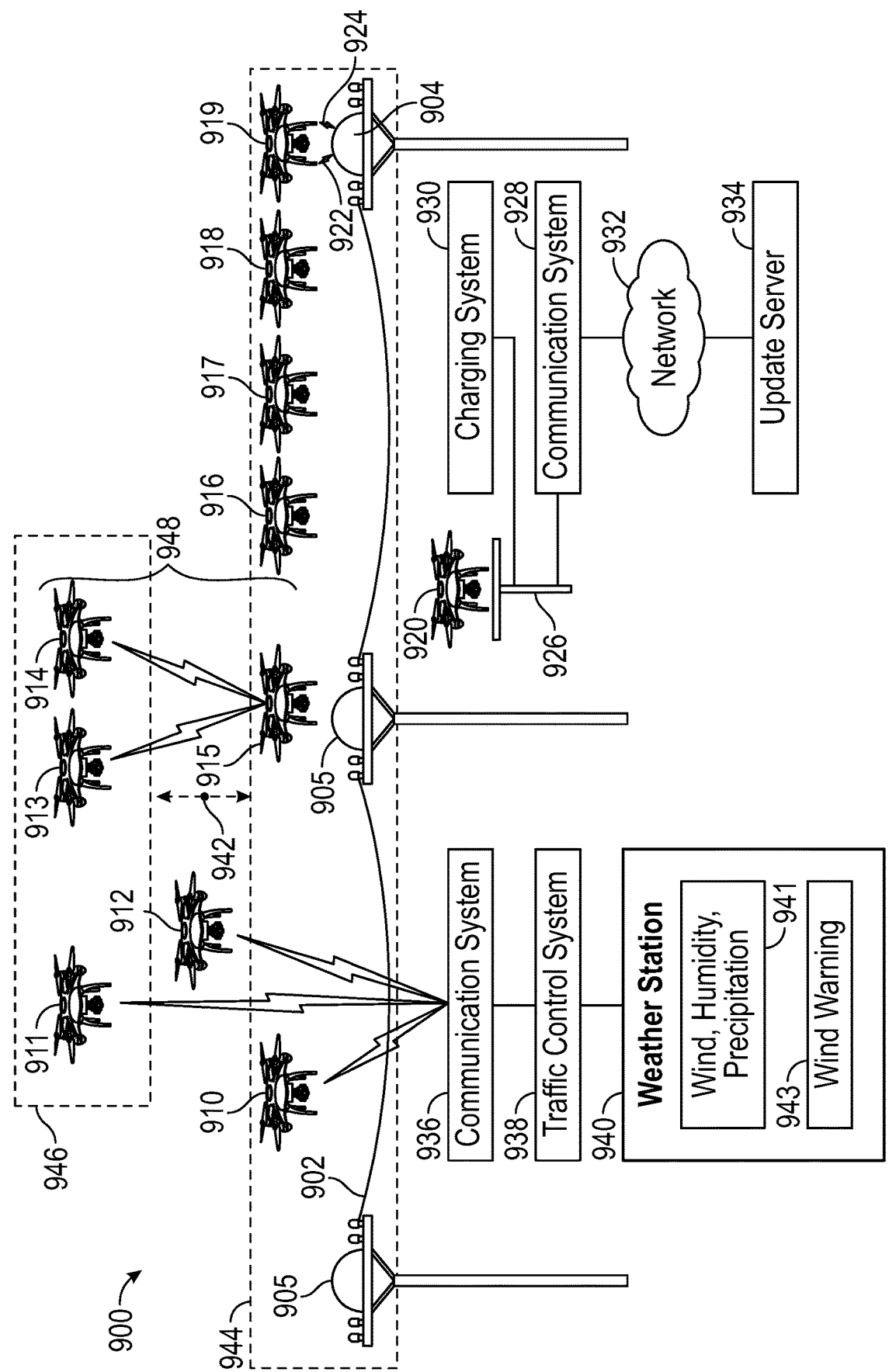
FIG. 9 is a diagram depicting an embodiment of an in-flight aircraft tracking system.

Referring to FIG. 9 an embodiment of an in-flight aircraft tracking system 900 is depicted. The system 900 may include a power transmission line 902 suspended in the air and which may be part of an electrical power distribution grid. Various drone aircrafts 910-920 may use the power transmission line 902 as a "highway" for short-distance or long-distance travel as described herein. When the aircrafts 910-920 are in a proximate position 944 to the power transmission line 902, they may be considered to be on the highway. When the aircrafts 910-920 are in a distal position 946, they may be considered to be off the highway. As used herein, a proximate position 944 may mean that the aircrafts are close enough to the power transmission line 902 to harvest electrical power from it, as described herein. A distal position 946 means that the aircrafts are far enough from the power transmission line 902 that no significant power harvesting may be conducted. In practice, various positions, or lanes, may be designated at predetermined distances or locations relative to the power distribution line 902. The power distribution line 902 may correspond to the power distribution line 112 described herein.

The system 900 may include at least one radio frequency identification (RFID) reader 904 configured to identify an aircraft 919 in proximity to the power transmission line 902. Additional RFID readers 905 may be positioned along the power transmission line 902 at regular intervals. The RFID reader 904 and the additional RFID readers 905 may be configured to identify the aircrafts 910-920 when they are in proximity to the power transmission line 902. This may enable the system 900 to be used for tracking the aircrafts 910-920 as they travel along the power transmission line 902. Although not shown in FIG. 9, the RFID readers 904, 905 may be used in a tracking system similar to those employed for toll roads or lanes on highways. The aircrafts 910-920 may be identified as they pass the each of the RFID readers 904, 905 and registered owners of the aircrafts 910-920 may be billed accordingly. This may provide an operator of the power transmission line 902 some reimbursement for power harvested from the power transmission line 902.

To illustrate, a reader signal 922 may be transmitted the RFID reader 904 to the aircraft 919 while the aircraft 919 is in proximity to the power transmission line 902. The aircraft 919 may be equipped with an RFID transmitter and may transmit an identification signal 924 to the RFID reader 904 in response. In some cases, each of the aircrafts 910-920 may not need an RFID transmitter. For example, the aircraft 919 may be equipped with an RFID transmitter while additional aircrafts 916-918 may be configured to fly in a formation relative to the aircraft 919. The identification signal 924 may include data that identifies the aircraft 919 and also indicates information regarding the additional aircraft 916-918, such as a quantity of the additional aircrafts 916-918.

In some embodiments, the system includes a landing pad 926 adapted to receive some or all of the aircrafts 910-920. FIG. 9 depicts an aircraft 920 as being in a landed state on the landing pad 926. While the aircraft 920 is landed, a communication system 928 may be communicatively coupled to the aircraft 920, through either a wired or wireless connection. The communication system 928 may interface with the aircraft 920. Data, such as a software update, may be provided to the aircraft 920 via the communication system 928. In some cases, the data may be provided over a network 932 by an update server 934. The network 932 may be a local-area network, a wide-area network, or another type of data network. In some cases, the network 932 may be the internet or a satellite network.

The system 900 may also include a charging system 930. The charging system 930 may be configured to charge the aircraft 920 while it is landed, or any of the other aircrafts 910-919 when they land. In some cases, charging the aircraft 920 may include providing wired electrical power to the aircraft 920. In other cases, charging the aircraft 920 may include swapping a depleted, or nearly depleted, battery pack, capacitor, or super capacitor for a charged one.

The system 900 may have at least one point 942 (and in practice, several points) along the power transmission line 902 that may be designated as an entrance, an exit, or both. The point 942 may be a designated location for the aircrafts 910-920 to switch between the proximate position 944 and the distal position 946 relative to the power transmission line 902. In this way, the point 942 may be analogous to an on-ramp or an off-ramp of a highway.

A traffic control system 938 may coordinates movement of the aircrafts 910-920 while they are in proximity to the power transmission line 902. For example, FIG. 9 shows the aircrafts 910-912 in communication with a communication system 936. The communication system 936 may include a radio system configured to establish radio communication with any of the aircrafts 910-920. The traffic control system 938 may communicate traffic instructions to the aircrafts 910-912. In particular, the traffic control system 938 may coordinate movement at the point 942. The traffic control system 938 may be automated through the use of software and a set of encoded rules for the movement of the aircrafts 910-920.

Alternatively, the multiple aircrafts 910-920 may be configured to communicate between each other in a peer-to-peer network 948. For example, FIG. 9 shows the aircrafts 913-915 in a peer-to-peer network, which may be used to coordinate movement at the point 942 and/or along the power transmission line 902.

The system 900 may include a weather station 940 configured to measure wind, humidity, and precipitation 941 at a position proximate to the power transmission line 902. The weather station 940 may further communicate data regarding the wind, humidity, and precipitation 941 to the aircrafts 910-920 that are in proximity to the power transmission line 902. For example, the weather station 940 may communicate a wind warning 943 to the aircrafts 910-920 when a windspeed exceeds a threshold value. Weather data and wind warnings may also be communicated within the peer-to-peer network 948.

Figure 10:
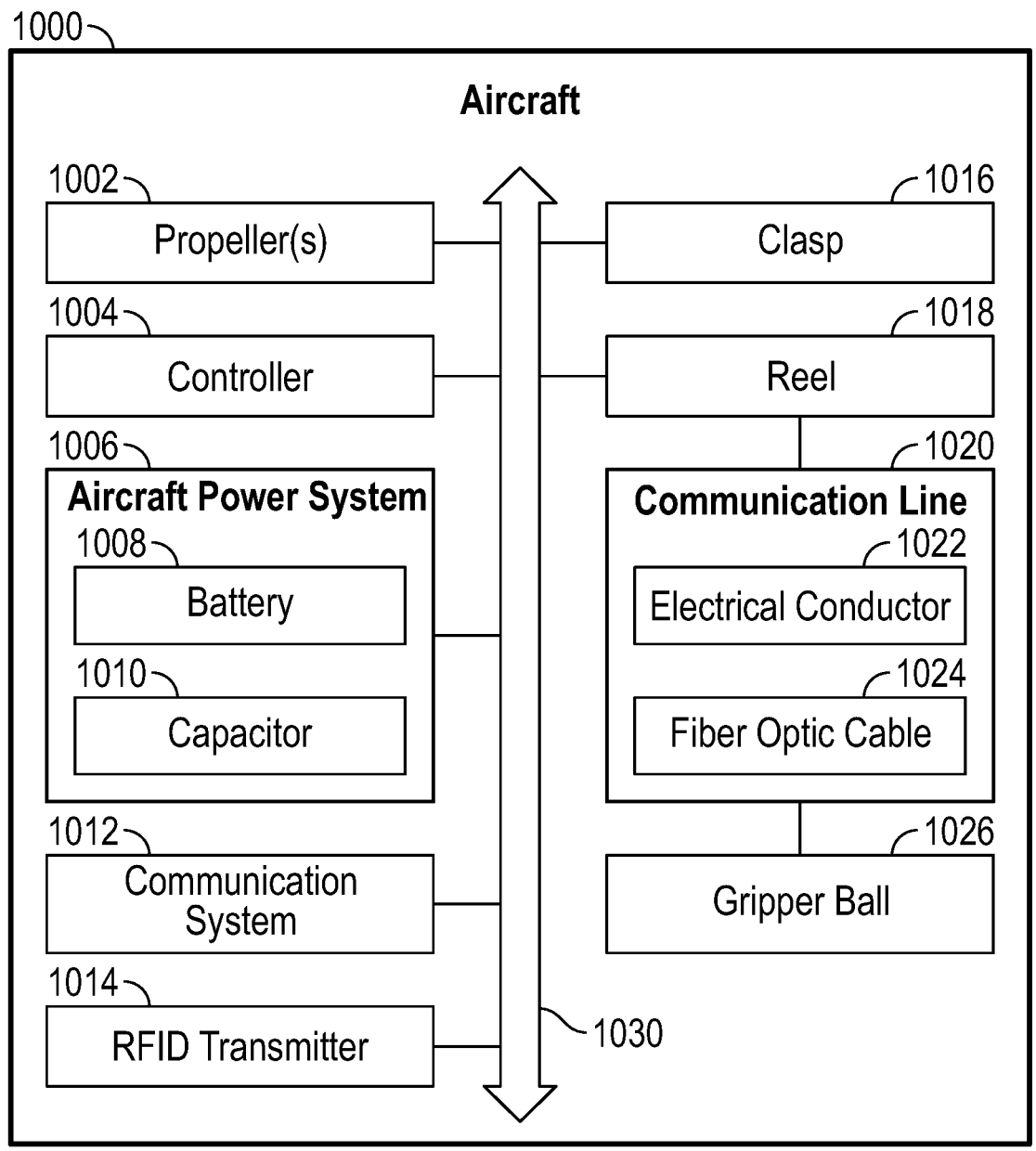
FIG. 10 is a block diagram depicting an embodiment of an aircraft for use with an in-flight aircraft tracking system.

Referring to FIG. 10 an embodiment of an aircraft 1000 for use with an in-flight aircraft tracking system is depicted. The aircraft 1000 may correspond to any of the aircrafts described herein, such as the aircrafts 102, 302, 500, 910-920.

The aircraft 1000 may include one or more propellers 1002, a controller 1004, an aircraft power system 1006, a communication system 1012, and an RFID transmitter 1014. The aircraft 1000 may also include a clasp 1016, a reel 1018, a communication line 1020, and a gripper ball 1026. The systems associated with the aircraft 1000 are illustrated as being joined by a bus 1030. In practice, multiple communication lines and power lines may couple each of the systems together. The disclosure is not intended to be limited to any particular configuration.

The controller 1004 may include any type of physical and/or structural electrical control system that can be used to initiate or perform the operations associated with the aircrafts as described herein. For example, the controller may include a microcontroller, a central processing unit (CPU), a graphical processing unit (GPU), a digital signal processor (DSP), a peripheral interface controller (PIC), another type of microprocessor, and/or combinations thereof. Further, the controller 1004 may be implemented as one or more integrated circuits, complementary metal-oxide-semiconductor (CMOS) field-effect-transistor (MOSFET) circuits, very-large-scale-integrated (VLSI) circuits, field-programmable gate arrays (FPGAs), application-specific integrated circuit (ASICs), combinations of logic gate circuitry, other types of digital or analog electrical design components, or combinations thereof.

The aircraft power system may include a battery 1008, a capacitor 1010, or both to provide power for the propellers 1002, the controller 1004, the communication system 1012, RFID transmitter 1014, the clasp 1016, and the reel 1018. In some cases, the battery 1008, the capacitor 1010, or both may have sufficient capacity to charge other aircraft while also powering the aircraft 1000 as described herein.

The communication system 1012 may be configured to communicate with other aircrafts, with the communication systems 928, 936 of FIG. 9, with other communication systems, or combinations thereof. The RFID transmitter 1014 may be configured to communicate with an RFID reader, such as the RFID reader 904 and/or the additional RFID readers 905 of FIG. 9.

The clasp 1016 may be configured to interact with a gripper ball of another aircraft. The reel 1018 may extend and retract the communication line 1020. The gripper ball 1026 may interact with a clasp of another aircraft to connect the communication line 1020 to the other aircraft. The communication line 1020 may include an electrical conductor 1022 and/or a fiber optic cable 1024 for data communication, power transfers, and shared power harvesting as described herein.

The aircraft 1000 may enable power harvesting and data communication through a shared communication line 1020 when the aircraft 1000 is tethered to another aircraft via the gripper ball 1026 or the clasp 1016. The aircraft 1000 may also enable aircraft tracking and metering via the RFID transmitter 1014 when the aircraft is flying in proximity a power transmission line. Other benefits may exist.

Figure 11:
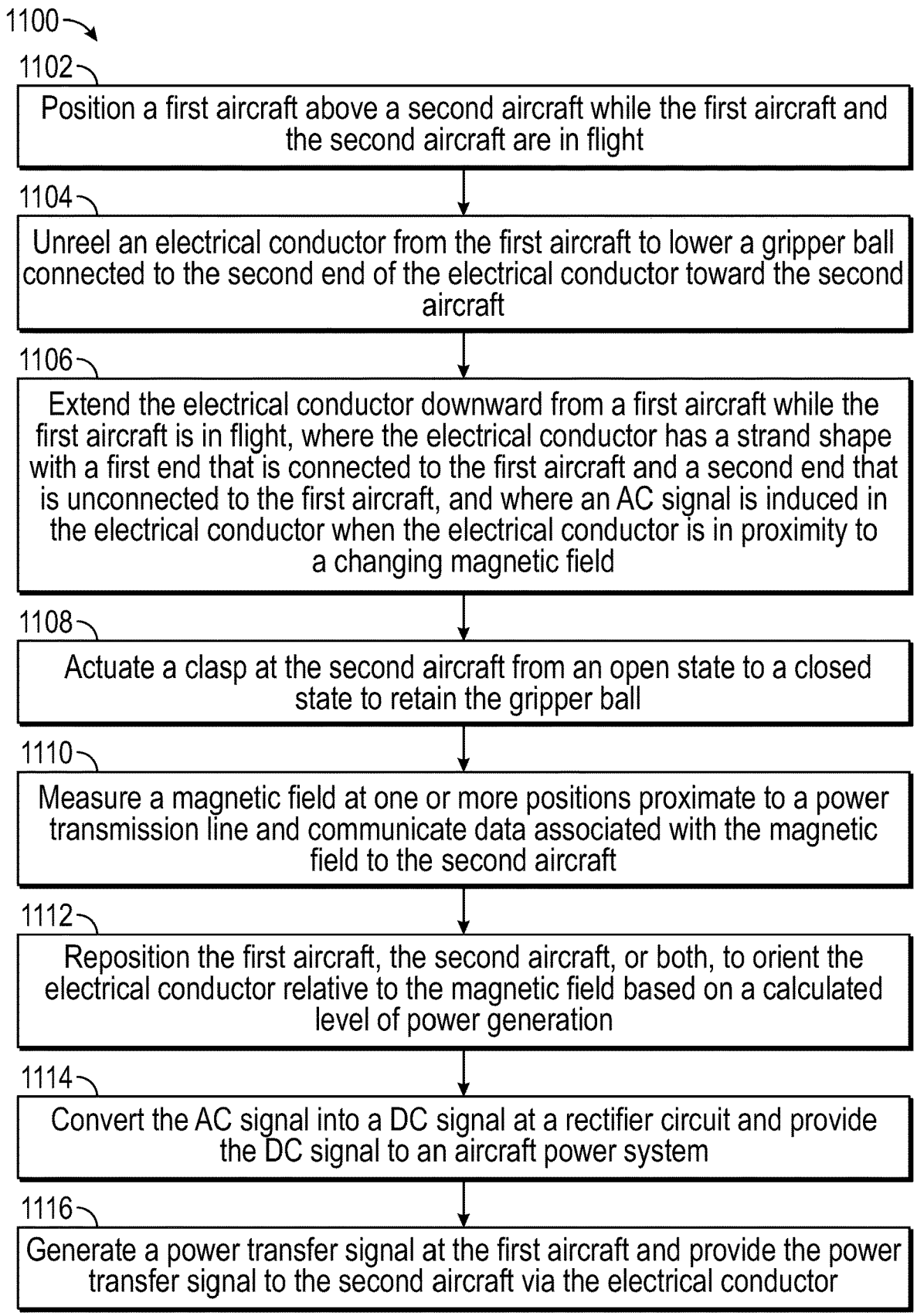
FIG. 11 is a flow diagram depicting an embodiment of an in-flight power recharging method.

Referring to FIG. 11, an embodiment of an in-flight power recharging method 1100 is depicted. The method 1100 may include positioning a first aircraft above a second aircraft while the first aircraft and the second aircraft are in flight, at 1102. For example, the first aircraft 102 may be positioned above the second aircraft 302.

The method 1100 may further include unreeling an electrical conductor from the first aircraft to lower a gripper ball connected to the second end of the electrical conductor toward the second aircraft, at 1104. For example, the electrical conductor 104 may be unreeled from the first aircraft 102 to lower the gripper ball 304 toward the second aircraft 302.

The method 1100 may also include extending the electrical conductor downward from a first aircraft while the first aircraft is in flight, where the electrical conductor has a strand shape with a first end that is connected to the first aircraft and a second end that is unconnected to the first aircraft, and where an AC signal is induced in the electrical conductor when the electrical conductor is in proximity to a changing magnetic field, at 1106. For example, the electrical conductor 104 may be lowered from the aircraft 102. In some embodiments, extending the electrical conductor may be incorporated in the process of unreeling the electrical conductor.

The method 1100 may include actuating a clasp at the second aircraft from an open state to a closed state to retain the gripper ball, at 1108. For example, the clasp 306 may be actuated from an open state to a closed state to retain the gripper ball 304.

The method 1100 may further include measuring a magnetic field at one or more positions proximate to a power transmission line and communicating data associated with the magnetic field to the second aircraft, at 1110. For example, the first aircraft 102 may measure the magnetic field 110 at one or more positions proximate to the power transmission line 112 and communicate data associated with the magnetic field 110 to the second aircraft 302.

The method 1100 may also include repositioning the first aircraft, the second aircraft, or both, to orient the electrical conductor relative to the magnetic field based on a calculated level of power generation, at 1112. For example, the electrical conductor 104 may be oriented by the first aircraft 102 and/or second aircraft 302.

The method 1100 may include converting the AC signal into a DC signal at a rectifier circuit and providing the DC signal to an aircraft power system, at 1114. For example, the AC signal 108 may be converted into the DC signal 204 at the rectifier circuit 202 and the DC signal 204 may be provided to the aircraft power system 206.

The method 1100 may further include generating a power transfer signal at the first aircraft and providing the power transfer signal to the second aircraft via the electrical conductor, at 1116. For example, the power transfer signal 454 may be generated at the first aircraft 102 and may be provided to the second aircraft 302 via the electrical conductor 104.

In some embodiments, only portions of the method 1100 may be performed. For example, in a single aircraft embodiment, instead of attaching the electrical conductor 104 to the second aircraft, the first aircraft may let the electrical conductor hang freely within a magnetic field while converting the AC signal into a DC signal for use by the aircraft power system.

Figure 12:
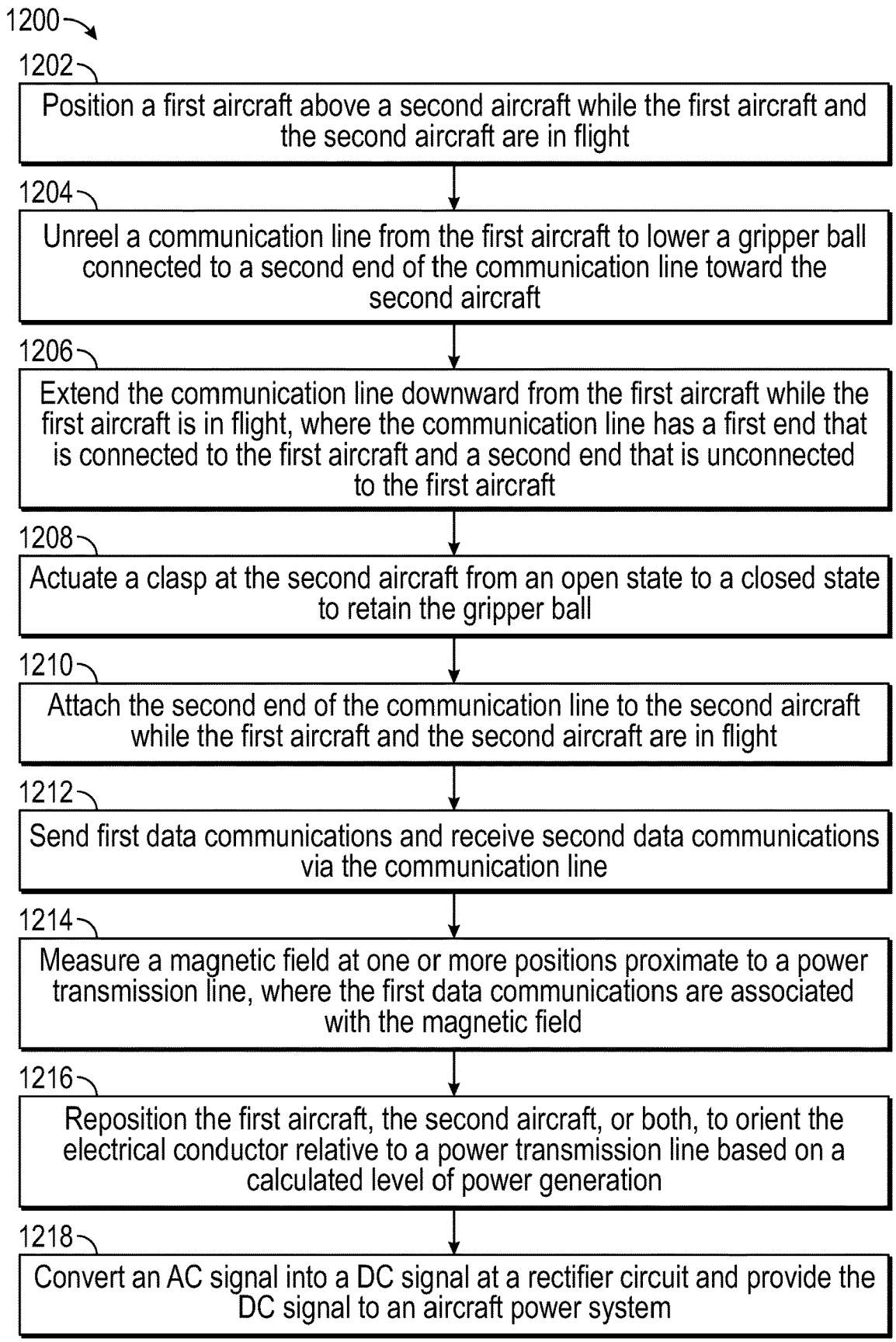
FIG. 12 is a flow diagram depicting an embodiment of an in-flight data sharing method.

Referring to FIG. 12, an embodiment of an in-flight data sharing method 1200 is depicted. The method 1200 may include positioning a first aircraft above a second aircraft while the first aircraft and the second aircraft are in flight, at 1202. For example, the first aircraft 102 may be positioned over the second aircraft 302.

The method 1200 may further include unreeling a communication line from the first aircraft to lower a gripper ball connected to a second end of the communication line toward the second aircraft, at 1204. For example, the communication line 704 may be unreeled from the first aircraft 102 to lower the gripper ball 710 toward the second aircraft 302.

The method 1200 may also include extending the communication line downward from the first aircraft while the first aircraft is in flight, where the communication line has a first end that is connected to the first aircraft and a second end that is unconnected to the first aircraft, at 1206. For example, the communication line 704 may be extended downward from the first aircraft 102 while the first aircraft 102 is in flight. In some embodiments, extending the communication line is incorporated into unreeling the communication line.

The method 1200 may include actuating a clasp at the second aircraft from an open state to a closed state to retain the gripper ball, at 1208. For example, the clasp 712 may be actuated at the second aircraft 302 from an open state to a closed state to retain the gripper ball 710.

The method 1200 may further include attaching the second end of the communication line to the second aircraft while the first aircraft and the second aircraft are in flight, at 1210. For example, the second end 706 of the communication line 704 may be attached to the second aircraft 302 while the first aircraft 102 and the second aircraft 302 are in flight. In some embodiments, attaching the second end of the communication line to the second aircraft is incorporated into actuating the clasp.

The method 1200 may also include sending first data communications and receiving second data communications via the communication line, at 1212. For example, the first data communications 806 may be sent and the second data communications 807 may be received via the communication line 704.

The method 1200 may include measuring a magnetic field at one or more positions proximate to a power transmission line, where the first data communications are associated with the magnetic field, at 1214. For example, the magnetic field 110 may be measured at one or more positions proximate to the power transmission line 112.

The method 1200 may further include repositioning the first aircraft, the second aircraft, or both, to orient the electrical conductor relative to a power transmission line based on a calculated level of power generation, at 1216. For example, the first aircraft 102, the second aircraft 302, or both may be repositioned to orient the electrical conductor 104 relative to the power transmission line 112 based on a calculated level of power generation.

The method 1200 may further include converting an AC signal into a DC signal at a rectifier circuit and providing the DC signal to an aircraft power system, at 1218. For example, the AC signal 108 may be converted into the DC signal 204 at the rectifier circuit 202, which may be provided to the aircraft power system 206.

Figure 13:
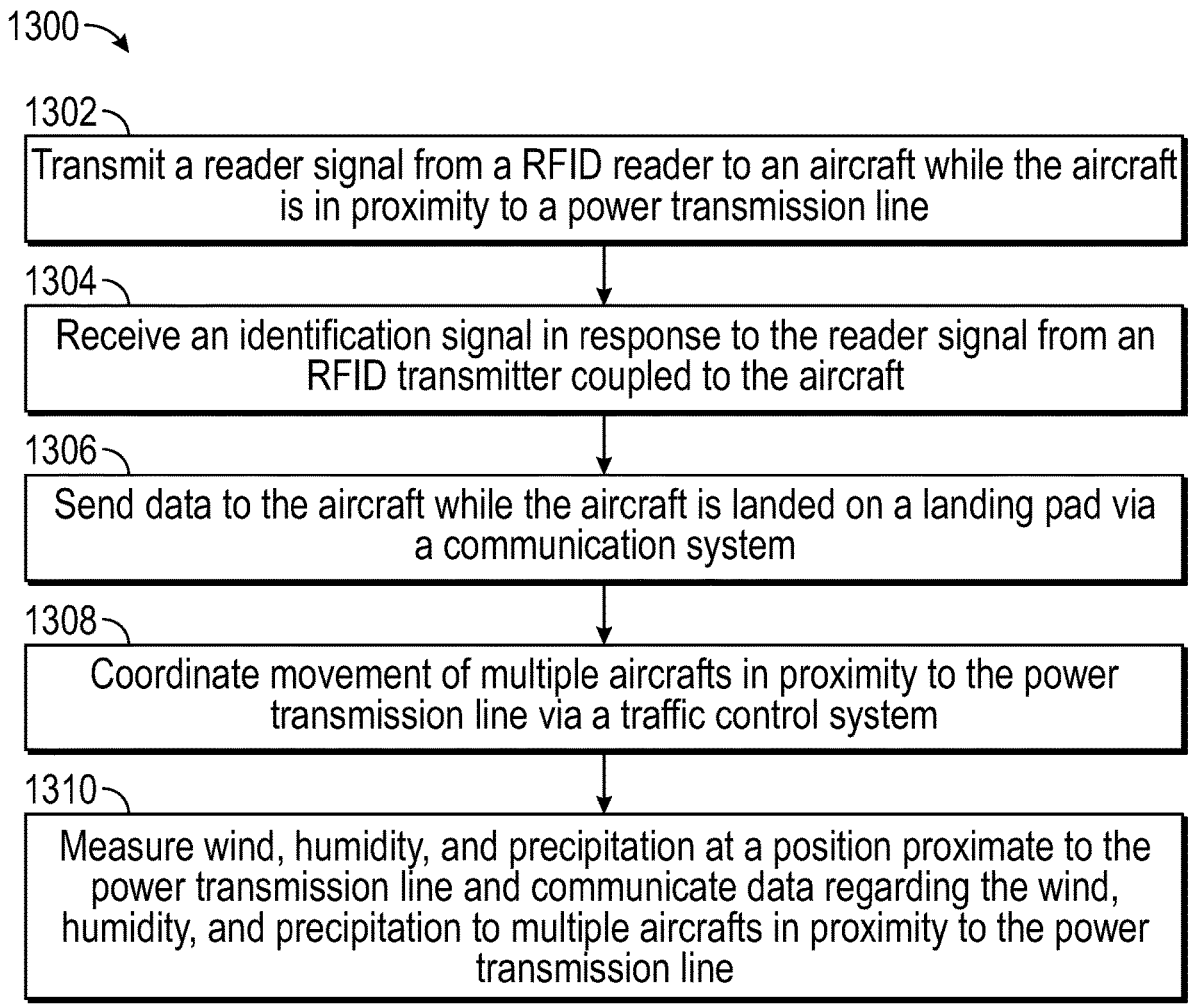
FIG. 13 is a flow diagram depicting an embodiment of an in-flight aircraft tracking method.

Referring to FIG. 13, an embodiment of an in-flight aircraft tracking method 1300 is depicted. The method 1300 may include transmitting a reader signal from a RFID reader to an aircraft while the aircraft is in proximity to a power transmission line, at 1302. For example, the reader signal 922 may be transmitted from the RFID reader 904 to the aircraft 919 while the aircraft 919 is in proximity to the power transmission line 902.

The method 1300 may further include receiving an identification signal in response to the reader signal from an RFID transmitter coupled to the aircraft, at 1304. For example, the identification signal 924 may be received in response to the reader signal 922 from the RFID transmitter 1014 coupled to the aircraft 919.

The method 1300 may also include sending data to the aircraft while the aircraft is landed on a landing pad via a communication system, at 1306. For example, data, such as a software update, may be sent to the aircraft 920 while the aircraft 920 is landed on the landing pad 926 via the communication system 928.

The method 1300 may include coordinating movement of multiple aircrafts in proximity to the power transmission line via a traffic control system, at 1308. For example, movement of the multiple aircrafts 910-920 may be coordinated while they are in proximity to the power transmission line 902 via a traffic control system 938.

The method 1300 may further include measuring wind speed and direction, humidity, and precipitation at a position proximate to the power transmission line and communicating data regarding the wind, humidity, and precipitation to multiple aircrafts in proximity to the power transmission line, at 1310. For example, the wind, humidity, and precipitation 941 may be measured at a position proximate to the power transmission line 902 by the weather station 940 and data regarding the wind, humidity, and precipitation 941 may be communicated to the multiple aircrafts 910-920 while they are in proximity to the power transmission line 902.

Although various embodiments have been shown and described, the present disclosure is not so limited and will be understood to include all such modifications and variations as would be apparent to one skilled in the art.

What is claimed is:

1. An in-flight aircraft tracking system comprising: a power transmission line suspended in air; and a radio frequency identification (RFID) reader configured to identify an aircraft in proximity to the power transmission line.

2. The system of claim 1, further comprising an RFID transmitter coupled to the aircraft, the RFID transmitter configured to transmit an identification signal in response to a reader signal from the RFID reader.

3. The system of claim 2, further comprising multiple additional aircrafts configured to fly in a formation relative to the aircraft, where the identification signal includes data that identifies the aircraft and indicates a quantity of the multiple additional aircrafts.

4. The system of claim 1, further comprising a landing pad and a communication system configured to interface with the aircraft while the aircraft is landed on the landing pad.

5. The system of claim 1, further comprising a traffic control system configured to coordinate movement of multiple aircrafts in proximity to the power transmission line.

6. The system of claim 1, wherein a point along the power transmission line is designated as an entrance, an exit, or both, and wherein the system further comprises multiple aircrafts configured to switch between a proximate position and a distal position relative to the power transmission line at the point.

7. The system of claim 6, wherein the multiple aircrafts are configured to communicate between each other in a peer-to-peer network to coordinate movement at the point.

8. The system of claim 6, further comprising a traffic control system configured to coordinate movement of the multiple aircrafts at the point.

9. The system of claim 1, further comprising a weather station configured to measure wind, humidity, and precipitation at a position proximate to the power transmission line.

10. The system of claim 9, wherein the weather station is further configured to communicate data regarding a wind speed and direction, humidity, and precipitation to multiple aircrafts in proximity to the power transmission line.

11. The system of claim 9, wherein the weather station is further configured to communicate a wind warning to multiple aircrafts when a windspeed exceeds a threshold value.

12. The system of claim 1, further comprising additional RFID readers positioned along the power transmission line and configured to identify aircrafts in proximity to the power transmission line.

13. An in-flight aircraft tracking system comprising:
an RFID reader configured to transmit a reader signal to an aircraft when the aircraft is in proximity to a power transmission line and an RFID transmitter coupled to the aircraft, the RFID transmitter configured to transmit an identification signal in response to the reader signal from the RFID reader; and
a traffic control system configured to coordinate movement of multiple aircrafts in proximity to the power transmission line.

14. The system of claim 13, further comprising a landing pad and a communication system configured to interface with the aircraft while the aircraft is landed on the landing pad.

15. The system of claim 13, further comprising a weather station configured to measure wind, humidity, and precipitation at a position proximate to the power transmission line.

16. The system of claim 15, wherein the weather station is further configured to communicate a wind warning to the aircraft when a windspeed exceeds a threshold value.

17. An in-flight aircraft tracking method comprising:
transmitting a reader signal from a RFID reader to an aircraft while the aircraft is in proximity to a power transmission line;
receiving an identification signal in response to the reader signal from an RFID transmitter coupled to the aircraft; and coordinating movement of multiple aircrafts in proximity to the power transmission line via a traffic control system.

18. The method of claim 17, further comprising sending data to the aircraft while the aircraft is landed on a landing pad via a communication system.

19. The method of claim 17, further comprising measuring wind, humidity, and precipitation at a position proximate to the power transmission line, and communicating data regarding the wind, humidity, and precipitation to multiple aircrafts in proximity to the power transmission line.

20. The method of claim 19, further comprising communicating a wind warning to the aircraft when a windspeed exceeds a threshold value.

* * * * *